(12) United States Patent
Liao et al.

(10) Patent No.: US 7,218,317 B2
(45) Date of Patent: May 15, 2007

(54) MECHANISM FOR REDUCING Z BUFFER TRAFFIC IN THREE-DIMENSIONAL GRAPHICS PROCESSING

(75) Inventors: Fred Liao, San Jose, CA (US); Michael Hong, Cupertino, CA (US)

(73) Assignee: Via Technologies, Inc., Taipei (TW)

( * ) Notice: Subject to any disclaimer, the term of this patent is extended or adjusted under 35 U.S.C. 154(b) by 594 days.

(21) Appl. No.: 10/648,496

(22) Filed: Aug. 25, 2003

(65) Prior Publication Data

US 2005/0057564 A1 Mar. 17, 2005

(51) Int. Cl.
*G06T 17/00* (2006.01)

(52) U.S. Cl. ............. 345/418; 345/421; 345/422; 345/501; 345/619; 381/232

(58) Field of Classification Search ........ 345/418, 345/421, 422, 501, 530, 545, 555, 557, 619; 382/232
See application file for complete search history.

(56) References Cited

U.S. PATENT DOCUMENTS

| | | | | |
|---|---|---|---|---|
| 6,052,125 | A * | 4/2000 | Gardiner et al. | 345/421 |
| 6,137,914 | A * | 10/2000 | Ligtenberg et al. | 382/240 |
| 6,362,818 | B1 * | 3/2002 | Gardiner et al. | 345/421 |
| 6,380,935 | B1 * | 4/2002 | Heeschen et al. | 345/423 |
| 6,411,295 | B1 | 6/2002 | Hung et al. | |
| 6,421,053 | B1 * | 7/2002 | Johns et al. | 345/441 |
| 6,473,082 | B1 | 10/2002 | Hong et al. | |
| 6,492,991 | B1 * | 12/2002 | Morein et al. | 345/555 |
| 6,580,427 | B1 | 6/2003 | Orenstein et al. | |
| 6,819,321 | B1 * | 11/2004 | Hsieh et al. | 345/506 |
| 2002/0130863 | A1 * | 9/2002 | Baldwin | 345/420 |
| 2002/0180747 | A1 * | 12/2002 | Lavelle et al. | 345/581 |
| 2002/0196251 | A1 * | 12/2002 | Duluk et al. | 345/420 |
| 2003/0080959 | A1 * | 5/2003 | Morein | 345/422 |

OTHER PUBLICATIONS

Apple Computer, U.C. Santa Cruz, entitled "Hierarchical Z-Buffer Visibility" by Ned Green, Michael Kass & Gavin Miller, (7 pgs).
Institute of Electrical and Electronics Engineers, entitled "LOCO-I: A Low Complexity, Context-Based, Lossless Image Compression Algorithm" by Marcelo J. Weinberger, Gadiel Seroussi and Guillermo Sapiro, Hewlett-Packard Laboratories, (11 pgs), © 1996.
Taiwan Publication No. 459207, published Oct. 11, 2001, which is a publication of Taiwan Application Serial No. 89107933, filed Apr. 27, 2000 (included with this publication is a copy of the corresponding U.S. Appl. No. 09/621,747, which will serve as a translation of the publication).

* cited by examiner

*Primary Examiner*—Bipin Shalwala
*Assistant Examiner*—Vincent E. Kovalck
(74) *Attorney, Agent, or Firm*—Bobby K. Truong; Hickman Palermo Truong & Becker LLP

(57) ABSTRACT

Z buffer traffic experienced during graphics processing is reduced by using a compression mechanism to reduce the amount of information stored in the z buffer. The compression mechanism may be a delta-based z compression mechanism, which stores deltas in the z buffer rather than actual z values. These deltas may be used at a later time to compute the z values. By storing deltas instead of actual z values, the compression mechanism makes it possible to store significantly less information in the z buffer. By reducing the amount of information stored in the z buffer, less information will be read from and written to the z buffer, which in turn, reduces z buffer traffic. To further reduce z buffer traffic, selected deltas may be stored not in the z buffer but rather in a storage local to a graphics processing mechanism (GPM). Storing selected deltas in local storage obviates the need to read from or write to the z buffer for those deltas. As a result, z buffer traffic is even further reduced.

90 Claims, 7 Drawing Sheets

MECHANISM FOR REDUCING Z BUFFER TRAFFIC IN THREE-DIMENSIONAL GRAPHICS PROCESSING

FIELD OF THE INVENTION

This invention relates generally to computer graphics, and more particularly to a mechanism for reducing Z buffer traffic in three-dimensional graphics processing.

BACKGROUND

In three-dimensional graphics processing, a z value is typically maintained for each pixel of a display screen. This z value provides an indication of how "deep" into the display screen the item represented by a pixel resides. For example, suppose that a pixel representing a current item (e.g. a portion of a tree) that is currently being displayed has a z value of Z0. Suppose further that a new item (e.g. a portion of a car) moves into the same pixel space as the current item, and that the new item has a z value of Z1 for that pixel. Since both items are rasterized to the same pixel, it is not possible for the pixel to display both items; thus, a choice has to be made. To make the choice, the z values of the two items are compared. If Z1 is less than Z0 (thereby indicating that the new item is less deep, and hence, is in front of the current item), then the pixel displays the new item, and the z value of the pixel is updated to Z1. On the other hand, if Z1 is greater than Z0 (thereby indicating that the new item is deeper, and hence, is behind the current item), then the pixel displays the current item, and the z value of the pixel is maintained at Z0. Implemented in this manner, the z value associated with a pixel is the z value of the item rasterized to that pixel that has the least depth.

The z values for the various pixels of a display are typically stored in a z buffer. Since there is a z value associated with each pixel, if a display has X horizontal pixels and Y vertical pixels, there will be an X times Y number of z values stored in the z buffer. For high-resolution displays, this can be a very large amount of information. Typically, the z buffer is read from and written to whenever a new display screen is generated. Given the large amount of information stored in the z buffer, these read and write operations can lead to enormous amounts of traffic between the z buffer and a graphics processing unit (GPU) which uses the information in the z buffer to generate display screens. It has been observed that this high traffic volume leads to slower processing performance. Consequently, to improve system performance, it is desirable to reduce z buffer traffic.

Some prior attempts have been made to reduce z buffer traffic. These efforts have led to the development of such methodologies as hierarchical z, two-pass rendering, and image-based z compression. Due to various reasons, however, such as low compression ratios, low efficiency, and limited application (e.g. application only to buffer reads and not writes), these methodologies have failed to yield satisfactory results. As a result, a mechanism, which reduces z buffer traffic more effectively, is needed.

SUMMARY

In accordance with one embodiment of the present invention, there is provided a compression mechanism for reducing the amount of information stored in a z buffer. In one embodiment, the compression mechanism is a delta-based z compression mechanism, which stores compressed information (e.g. deltas) in the z buffer rather than actual z values. These deltas may be used at a later time to derive the z values. By storing deltas instead of actual z values, the compression mechanism makes it possible to store significantly less information in the z buffer. By reducing the amount of information stored in the z buffer, less information will be read from and written to the z buffer, which in turn, reduces z buffer traffic.

To further reduce z buffer traffic, in one embodiment, selected sets of compressed information (e.g. deltas) are stored not in the z buffer but rather in a local storage accessible by a graphics processing mechanism (GPM). Storing selected deltas in local storage obviates the need to read from or write to the z buffer for those deltas. As a result, z buffer traffic is further reduced.

DETAILED DESCRIPTION OF EMBODIMENT(S)

Underlying Concepts

Definition of Basic Terms

Display—A display is a device (e.g. a CRT monitor, an LCD display, etc.) for rendering visual images to a user. A display comprises a plurality of pixels, arranged horizontally and vertically to form a pixel array. Each pixel can be individually manipulated to cause the display to render any desired visual image.

Frame—A frame represents the complete visual image that is rendered on the display at any particular moment in time. A frame comprises information for all of the pixels that make up the visual image. Frames change over time to allow the visual image on the display to change.

Tile—A tile is a subset of the pixel array of a display. A tile typically comprises a small set of horizontal and vertical pixels (e.g. an 8×8 square of pixels). A complete collection of tiles makes up the entire pixel array of a display.

Primitive—A primitive is a logical component that is used as a building block to construct objects in a visual image. In graphics processing, the primitive that is typically used is a polygon, and the polygon that is used most often is the triangle; thus, each object may be made up of one or more triangles. For example, a car may be composed of a plurality of triangles. Primitives are rasterized to tiles and pixels for rendering on a display. A primitive may be fully contained within a single tile, or it may span across multiple tiles (i.e. a primitive may cross tile boundaries). A primitive may encompass all of the pixels in a tile, or just a portion of the pixels in a tile.

Delta-Based Z Compression

One of the factors that leads to high z buffer traffic is the large amount of information stored in the z buffer. If this information volume is reduced, then z buffer traffic will also be reduced. Reducing the amount of information stored is a goal of delta-based z compression (hereinafter, delta compression). Delta compression is best understood with reference to an example.

Figure 1:
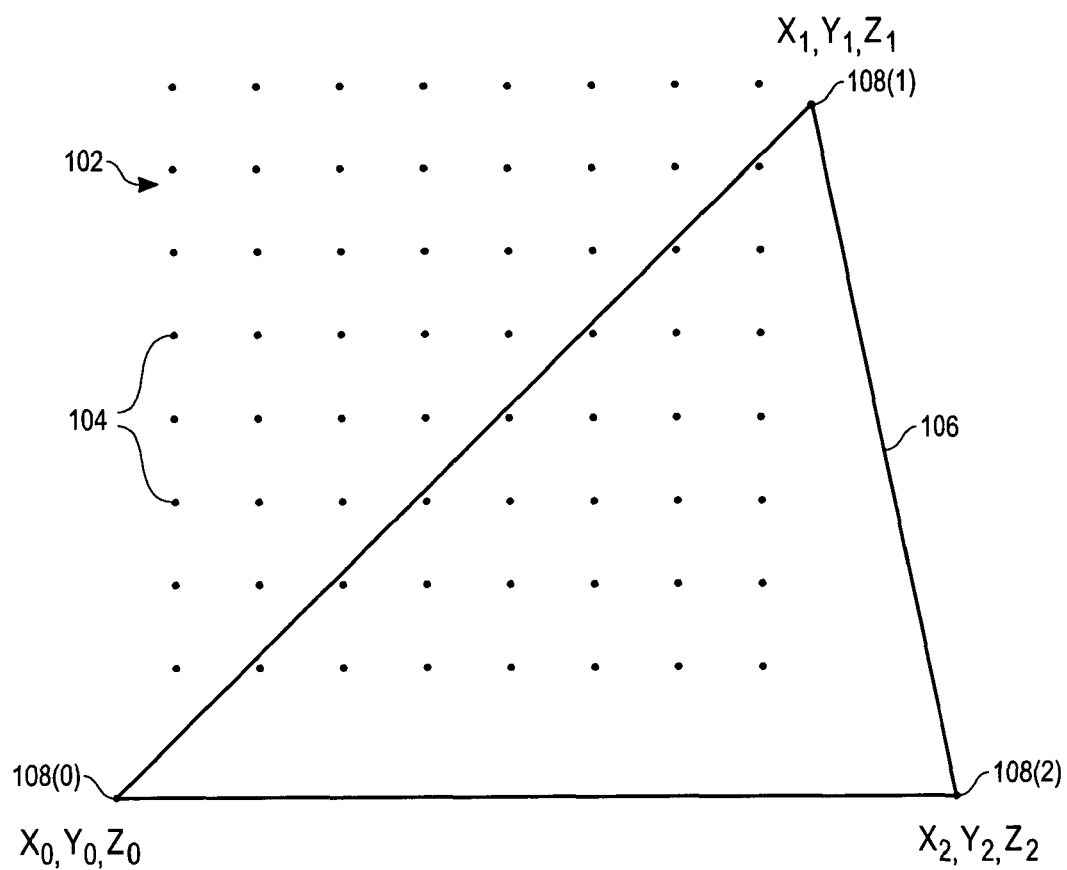
FIG. 1 shows an example of a primitive rasterized to a portion of a tile.

In FIG. 1, there is shown an 8×8 tile 102 comprising 64 pixels 104 (note: the dimensions 8×8 are used just as an example; delta compression may be applied to a tile having any p times q dimensions, where p and q are integers). Rasterized to a portion of this tile 102 is a primitive 106, which in this example takes the shape of a triangle (note: delta compression may be applied to any type of primitive, including but not limited to points, lines, and any polygons that have linear property of z; a triangle primitive is used herein for illustrative purposes only). Primitive 106 encompasses some but not all of the pixels 104 in the tile 102. Without compression, 64 sets of z values (since there are 64 pixels 104) would have to be stored in the z buffer for this tile 102. With delta compression, however, significantly less information will need to be stored.

As shown in FIG. 1, primitive 106 has 3 vertices 108(0), 108(1), 108(2). Vertex 108(0) has coordinates $X_0$, $Y_0$, $Z_0$, vertex 108(1) has coordinates $X_1$, $Y_1$, $Z_1$, and vertex 108(2) has coordinates $X_2$, $Y_2$, $Z_2$. Given these coordinates, the following simultaneous equations can be constructed and solved to derive a set of deltas for this primitive 106:

$$Z_0 = Z_s + Z_x * X_0 + Z_y * Y_0; \quad \text{Equation 1}$$

$$Z_1 = Z_s + Z_x * X_1 + Z_y * Y_1; \quad \text{Equation 2}$$

$$Z_2 = Z_s + Z_x * X_2 + Z_y * Y_2; \quad \text{Equation 3}$$

where the deltas are $Z_s$, $Z_x$, and $Z_y$. Notice that Equations 1, 2, and 3 are basically the same equation (i.e. $Z = Z_s + Z_x * X + Z_y * Y$), except that different coordinate values are plugged in for X, Y and Z (i.e. Equation 1 uses the coordinate values for vertex 108(0), Equation 2 uses the coordinate values for vertex 108(1), and Equation 3 uses the coordinate values for vertex 108(2)).

Once derived, these deltas can be used to compute the z value for any pixel 104 encompassed within the primitive 106. Specifically, the z values may be computed using the following equation:

$$Z_n = Z_s + Z_x * X_n + Z_y * Y_n; \quad \text{Equation 4}$$

where $X_n$ and $Y_n$ are the x and y coordinates of the pixel 104, and $Z_n$ is the computed z value for that pixel 104. Since the z values of the pixels 104 within primitive 106 can now be computed, they no longer need to be stored within the z buffer. Instead, just the deltas need to be stored. So long as the deltas are available, the z values can be computed/ derived at a later time. Because of this, much less information needs to be stored within the z buffer, which in turn, enables compression to be achieved.

Figure 2:
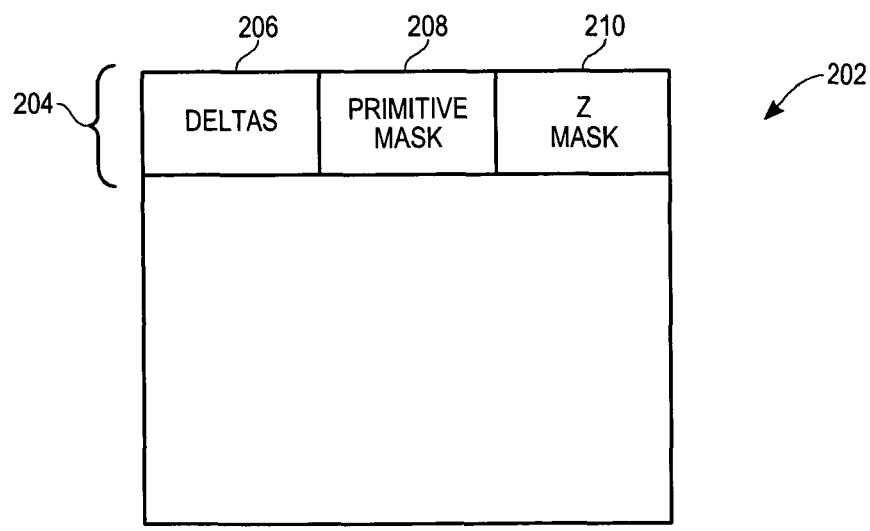
FIG. 2 shows a z buffer memory section storing delta information to illustrate the savings that can be achieved using delta compression.

The storage savings realized from delta compression is shown more clearly in FIG. 2, wherein a sample z buffer memory section 202 corresponding to the tile 102 of FIG. 1 is shown (in one embodiment, there is a z buffer memory section 202 for each tile 102). The memory section 202 comprises a header entry 204. In this entry, there is stored the deltas 206 (i.e. $Z_s$, $Z_x$, and $Z_y$) for primitive 106. Storing just the deltas 206 is not enough, though, because the deltas 206 do not specify to which pixels 104 they apply (i.e. which pixels are encompassed within the primitive 106).

To provide this information, there is also stored in the header entry 204 a primitive mask 208 and a z mask 210. The primitive mask 208 specifies which pixels 104 are encompassed within the primitive 106. The z mask 210 specifies which pixels 104 are not encompassed within any primitive. If a pixel 104 is not encompassed within any primitive, then the z value for that pixel 104 is the initial z value assigned to all pixels 104 at system startup. In one embodiment, each of the masks 208, 210 takes the form of a bit mask comprising 64 bits, with each bit corresponding to one of the 64 pixels 104 in the tile 102. In the primitive mask 208, each bit corresponding to a pixel 104 specifies whether that pixel 104 is encompassed within the primitive 106. In the z mask 210, each bit corresponding to a pixel 104 specifies whether that pixel 104 is encompassed within any primitive. Together, these masks 208, 210 can be used to determine precisely which pixels 104 are encompassed within which primitive.

From FIGS. 1 and 2, the savings that can be achieved with delta compression are made clear. Rather than storing 64 z values for tile 102, all that is stored are the deltas 206 ($Z_s$, $Z_x$, and $Z_y$), and two 64 bit masks 208, 210. This represents a significant reduction in information storage. It has been observed that significant compression can be achieved if the number of primitives that rasterize to a tile is small, which is very often the case. If the number of primitives that rasterize to a tile exceeds a certain number (which will differ from implementation to implementation), then it is actually more efficient from an overall resource utilization standpoint to store the actual z values rather than use delta compression. In one embodiment, z information may be stored in either compressed or uncompressed format in a z buffer memory section 202, depending upon which is more efficient.

Figure 3:
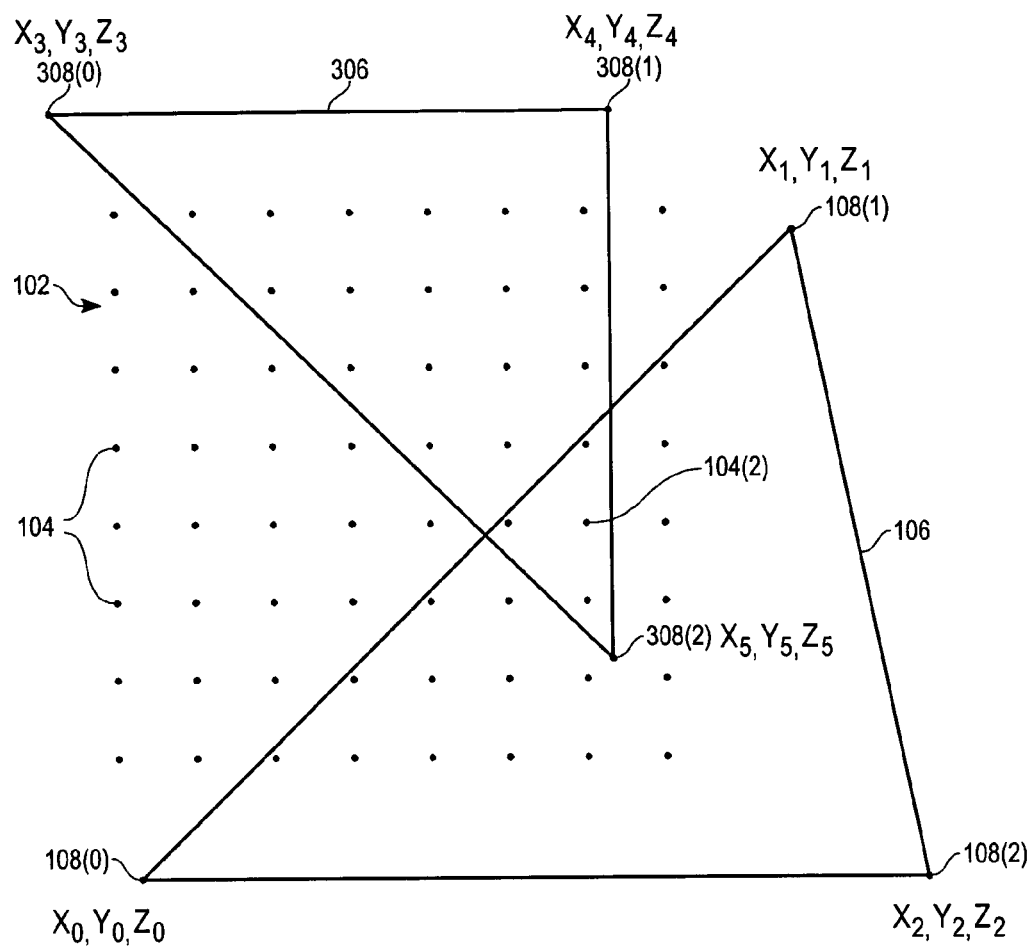
FIG. 3 shows an example of a tile to which multiple, overlapping primitives are rasterized.

FIG. 1 shows the simple case of just one primitive 106 rasterized to the tile 102. In more complex cases, multiple primitives may be rasterized to the same tile, and these primitives can overlap. An example of this is shown in FIG. 3, wherein a second primitive 306 is rasterized to tile 102, and this primitive 306 partially overlaps with primitive 106. Similar principles as those described above may be used to store delta compressed information for this scenario.

Specifically, notice that like primitive 106, primitive 306 also has three vertices 308(0), 308(1), 308(2). Each vertex has an associated set of X, Y, and Z coordinates (($X_3$, $Y_3$, $Z_3$), ($X_4$, $Y_4$, $Z_4$), ($X_5$, $Y_5$, $Z_5$)). Using these coordinates, the following simultaneous equations can be constructed and solved to derive the deltas $Z_s$, $Z_x$, and $Z_y$ for primitive 306:

$$Z_3 = Z_s + Z_x * X_3 + Z_y * Y_3; \quad \text{Equation 5}$$

$$Z_4 = Z_s + Z_x * X_4 + Z_y * Y_4; \quad \text{Equation 6}$$

$$Z_5 = Z_s + Z_x * X_5 + Z_y * Y_5; \quad \text{Equation 7}$$

Once derived, these deltas can be used to compute the z value for any pixel 104 encompassed within the primitive 306 using the Equation 4 previously provided, where $X_n$ and $Y_n$ are the x and y coordinates of the pixel 104, and $Z_n$ is the computed z value for that pixel 104. Because the z values can be computed at a later time using the deltas, just the deltas (and not the actual z values) need to be stored for primitive 306.

Figure 4:
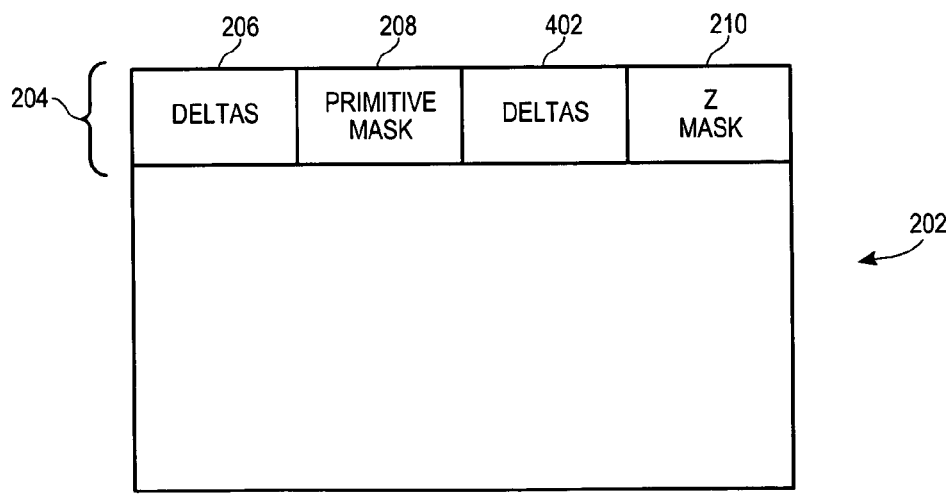
FIG. 4 shows a z buffer memory section in which deltas corresponding to different primitives are stored.

FIG. 4 shows the contents of the z buffer memory section 202 corresponding to tile 102 given the scenario shown in FIG. 3. Because there are now two primitives 106, 306 rasterized to tile 102, there are now two sets of deltas (deltas 206 corresponding to primitive 106, and deltas 402 corresponding to primitive 306) stored in the memory section 202. With the addition of primitive 306, the z mask 210 and primitive mask 208 are updated. Recall from previous discussion that the z mask 208 specifies which pixels 104 are not encompassed within any primitive. Because more pixels 104 are now encompassed by primitives due the to the presence of primitive 306, the z mask 210 is updated to exclude the pixels encompassed by primitive 306.

The primitive mask 208 is also updated. In one embodiment, this mask 208 is shared between the two sets of deltas 206, 402. While it is possible to have a separate primitive mask for each set of deltas, it has been observed that sharing the mask 208 is more space efficient and hence, provides better compression. With a shared primitive mask 208, each bit in the mask specifies to which set of deltas a corresponding pixel 104 belongs. For example, if a bit value is "0", then the pixel 104 corresponding to that bit belongs to deltas 206, and hence, primitive 106. On the other hand, if the bit value is "1", then the pixel 104 corresponding to that bit belongs to deltas 402, and hence, primitive 306. For those pixels that do not belong to either primitive 106, 306, their corresponding bits are assigned some default value (e.g. "0"). This may make it appear that one or the other primitive 106, 306 encompasses more pixels than it actually does. However, recall that the z mask 210 specifies which pixels do not belong to any primitive. By processing the z mask 210 with the primitive mask 208, it is possible to filter out any extraneous pixels to determine precisely which pixels are encompassed by which primitive.

In FIG. 3, some of the pixels are bounded by both primitives 106, 306. For these pixels, it is not immediately clear, for purposes of the primitive mask 208, which pixel is encompassed by which primitive. In one embodiment, to determine the proper primitive, a comparison of z values is performed. To illustrate, reference will be made to pixel 104(z), which is bounded by both primitives 106, 306. Initially, a z value for pixel 104(z) is computed using the deltas 206 associated with primitive 106. Then, a z value for the same pixel 104(z) is computed using the deltas 402 associated with primitive 306. These z values are thereafter compared to determine which is the lesser value (to determine, for that pixel 104(z), which primitive 106, 306 is in front of the other). If the z value derived using deltas 206 is the lesser value, then the pixel 104(z) is encompassed by and hence is assigned to primitive 106. If the z value derived using deltas 402 is the lesser value, then the pixel 104(z) is encompassed by and hence is assigned to primitive 306. The bit in the primitive mask 208 corresponding to this pixel 104(z) is set accordingly. A similar process may be implemented for each pixel bounded by both primitives 106, 306 to specify to which primitive that pixel belongs.

Figure 5:
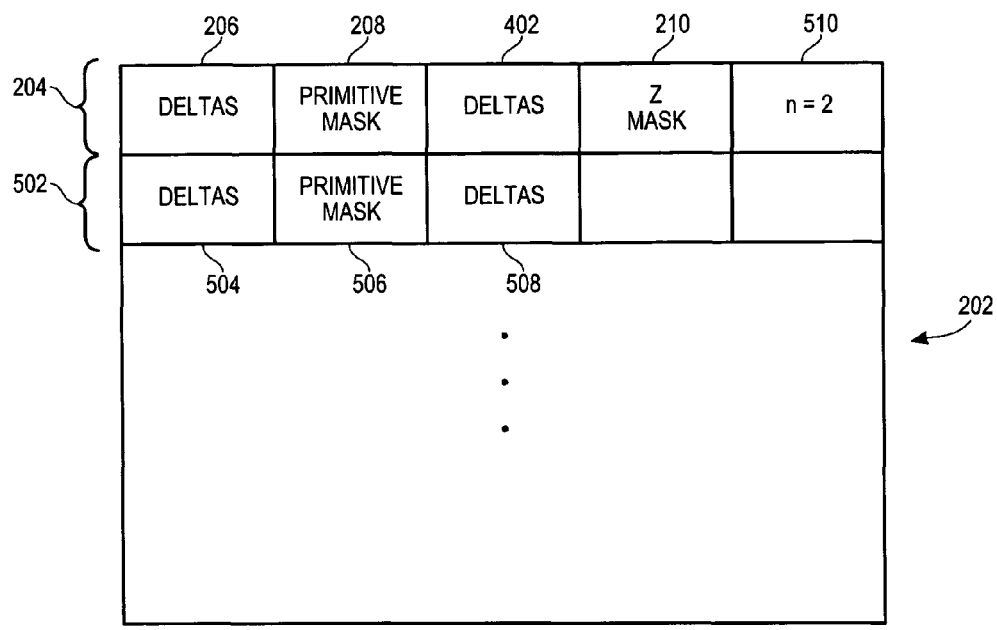
FIG. 5 shows a z buffer memory section with multiple entries for storing multiple sets of deltas and multiple primitive masks.

FIG. 3 shows just two primitives 106, 306. In actual practice, more primitives may be rasterized to tile 102. FIG. 5 shows how delta compressed information may be stored in the z buffer memory section 202 in such a scenario. In one embodiment, if a third primitive (not shown) is rasterized to tile 102, then the deltas 504 for that primitive would be stored in an additional entry 502 in the memory section 202. An additional primitive mask 506 would also be stored. If a fourth primitive (not shown) is rasterized to tile 102, then the deltas 508 for that primitive would further be stored in entry 502. In one embodiment, there is one primitive mask per two sets of deltas, and each entry 204, 502 in the memory section 202 accommodates two deltas and one primitive mask, as shown. Thus, if six primitives are rasterized to tile 102, then the memory section 202 would have a third entry (not shown), and that third entry would store the deltas for the fifth and sixth primitives, and an additional primitive mask.

Since the memory section 202 can have a variable number of entries, there is provided an additional field 510 in the header entry 204 for storing an integer n, which specifies how many entries are currently occupied in the memory section 202. In the example shown in FIG. 5, n is 2 because there are two entries 204, 502 occupied with delta and mask information. If more primitives are rasterized to tile 102, n can grow (e.g. if six primitives are rasterized to tile 102, thereby requiring a third entry to store the delta and mask information, then n would be 3). Specifying n in the header entry 204 in this manner makes it easy to determine, at a later time, how many entries in the memory section 202 need to be read to obtain all of the delta compressed information stored in that memory section 202.

From a conceptual standpoint, the process disclosed above may be implemented to accommodate any number of primitives rasterized to tile 102. However, as noted previously, there is a practical limit to how many primitives may be rasterized to a tile before it is more efficient to just store the actual z values rather than implementing delta compression. In one embodiment, before implementing delta compression, this limit is checked, and if exceeded, delta compression is not implemented for that tile.

It was disclosed previously that, in one embodiment, there is one primitive mask for every two sets of deltas. This does not necessarily mean, however, that each primitive mask is associated with just two sets of deltas and provides information for only those two sets of deltas (although this is a possible implementation). Rather, in one embodiment, the information in all of the primitive masks is combined to provide information for all of the deltas in a z buffer memory section 202.

To elaborate, recall that in one embodiment, each primitive mask is a bit mask, with each bit corresponding to a particular pixel in a tile. Each bit can take on only two possible values, a "0" or a "1". If there are more than two primitives rasterized to a tile 102, and hence, there are more than two set of deltas stored in a z buffer memory section 202, it is not possible, using just one bit, to uniquely specify to which set of deltas a particular pixel belongs. In the example shown in FIG. 5, there are four sets of deltas 206, 402, 504, 508. Using just one bit, it is not possible to uniquely specify to which of these four deltas a pixel belongs, because a bit can take on only two possible values. Note though that there are two primitive masks 208, 506 for the four deltas 206, 402, 504, 508. If the bits in these primitive masks 208, 506 are combined, then it may be possible to uniquely specify to which of these four deltas a pixel belongs.

For example, primitive mask 208 has a bit corresponding to the upper leftmost pixel of tile 102. Primitive mask 506 likewise has a bit corresponding to that same pixel. If these two bits are combined into a two-bit value, then it is possible to achieve four unique values: 00, 01, 10, 11. Each value can uniquely specify one of the four deltas. For example, if the combined two-bit value is 00, then the upper leftmost pixel belongs to deltas 206. If the value is 01, then the pixel belongs to deltas 402. If the value is 10, then the pixel belongs to deltas 504, and if the value is 11, then the pixel belongs to deltas 508. Thus, by combining the bits in the primitive masks 208, 506 in this way (referred to herein as bit packing), it is possible to uniquely specify to which of these four deltas each pixel belongs. This concept can be extended to three primitive masks and six sets of deltas, four primitive masks and eight sets of deltas, and so on. In such an implementation, each primitive mask is not its own mask, but rather is a part of an overall mask for all of the deltas in a z buffer memory section 202. One of the side effects of this is that when a primitive mask is added, it may be necessary to update one or more previous primitive masks. For example, when primitive mask 506 is added, it may be necessary to update primitive mask 208 (to change mask 208 from a mask that is associated with just one or two sets of deltas 206, 402 to a part of an overall combined mask that is associated with three or four sets of deltas 206, 402, 504, 508). Some of the benefits of doing this are that a primitive mask does not have to be a multi-bit mask until there are enough deltas to require it, and the overall combined primitive mask can grow as the number of deltas grows.

In the manner disclosed, delta compression can be used to significantly reduce the amount of information stored in each memory section 202 of a z buffer.

Large Primitives and Global Deltas

Delta compression reduces z buffer traffic by reducing the amount of information stored in the z buffer. Z buffer traffic may be further reduced by reducing the number of accesses to the z buffer. It has been observed by Applicants that, if certain common circumstances are exploited, many z buffer accesses can be avoided altogether. If such accesses are avoided, then z buffer traffic will be even further reduced.

Figure 6:
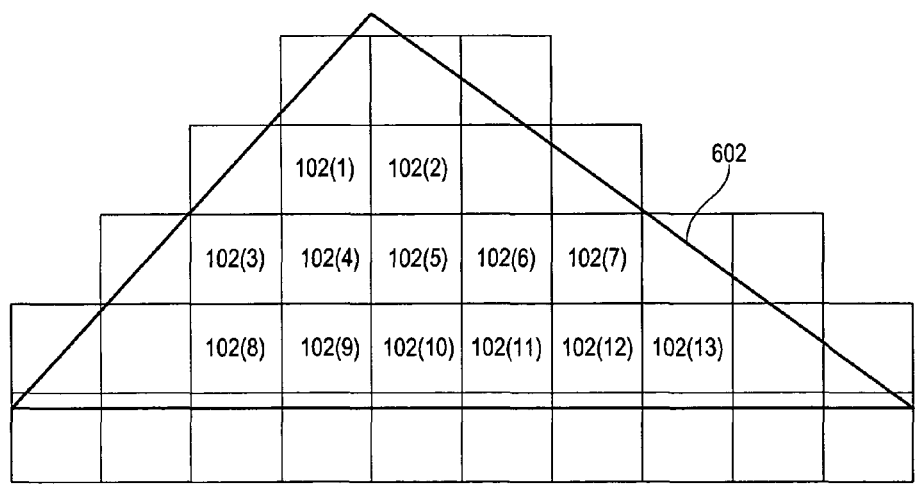
FIG. 6 shows an example of a large primitive rasterized to a plurality of tiles, wherein the large primitive completely encompasses some of the tiles.

To illustrate how z buffer accesses can be avoided, reference will be made to the example of FIG. 6, which shows a large primitive 602 rasterized to a plurality of tiles. Primitive 602 completely encompasses some of the tiles 102(1)–102(13), and only partially encompasses the other tiles. For the sake of discussion, it will be assumed that each tile has a corresponding z buffer memory section, and that delta compression is used to store information in the z buffer memory sections.

For the thirteen tiles 102(1)–102(13) that are completely encompassed by primitive 602, under the delta compression scheme disclosed previously, the following sets of information would be stored in each of the thirteen corresponding z buffer memory sections: (1) the deltas for primitive 602; (2) a primitive mask that specifies that all of the pixels in the tile belong to primitive 602; (3) a z mask that specifies that none of the pixels in the tile are not encompassed by a primitive; and (4) an integer n set to 1. Notice that this information is the same for every one of the thirteen tiles 102(1)–102(13). Thus, if this information is stored in each of the thirteen corresponding z buffer memory sections, it will mean that the exact same information will be written to the z buffer thirteen times. Likewise, when it comes time to read the information, the exact same information will be read out of the z buffer thirteen times. This redundant reading and writing of the same information is inefficient, and gives rise to additional, unnecessary z buffer traffic.

In one embodiment, to reduce redundancy and z buffer traffic, delta information for large primitives is not stored in the z buffer. Rather, the delta information for large primitives (referred to herein as global deltas) is stored in storage local to a graphics processing mechanism (GPM). That way, when the GPM needs the global deltas, it obtains them from the local storage rather than the z buffer. Likewise, when the GPM updates the global deltas, it updates the local storage rather than the z buffer. By doing so, repetitive reading and writing of the same information from and to the z buffer is eliminated, and z buffer traffic is reduced. It has been observed by Applicants that in most frames, a large percentage of tiles are completely encompassed by large primitives. Thus, by avoiding z buffer access for those tiles, a very significant amount of z buffer traffic can be eliminated.

Sample Embodiment

Figure 7:
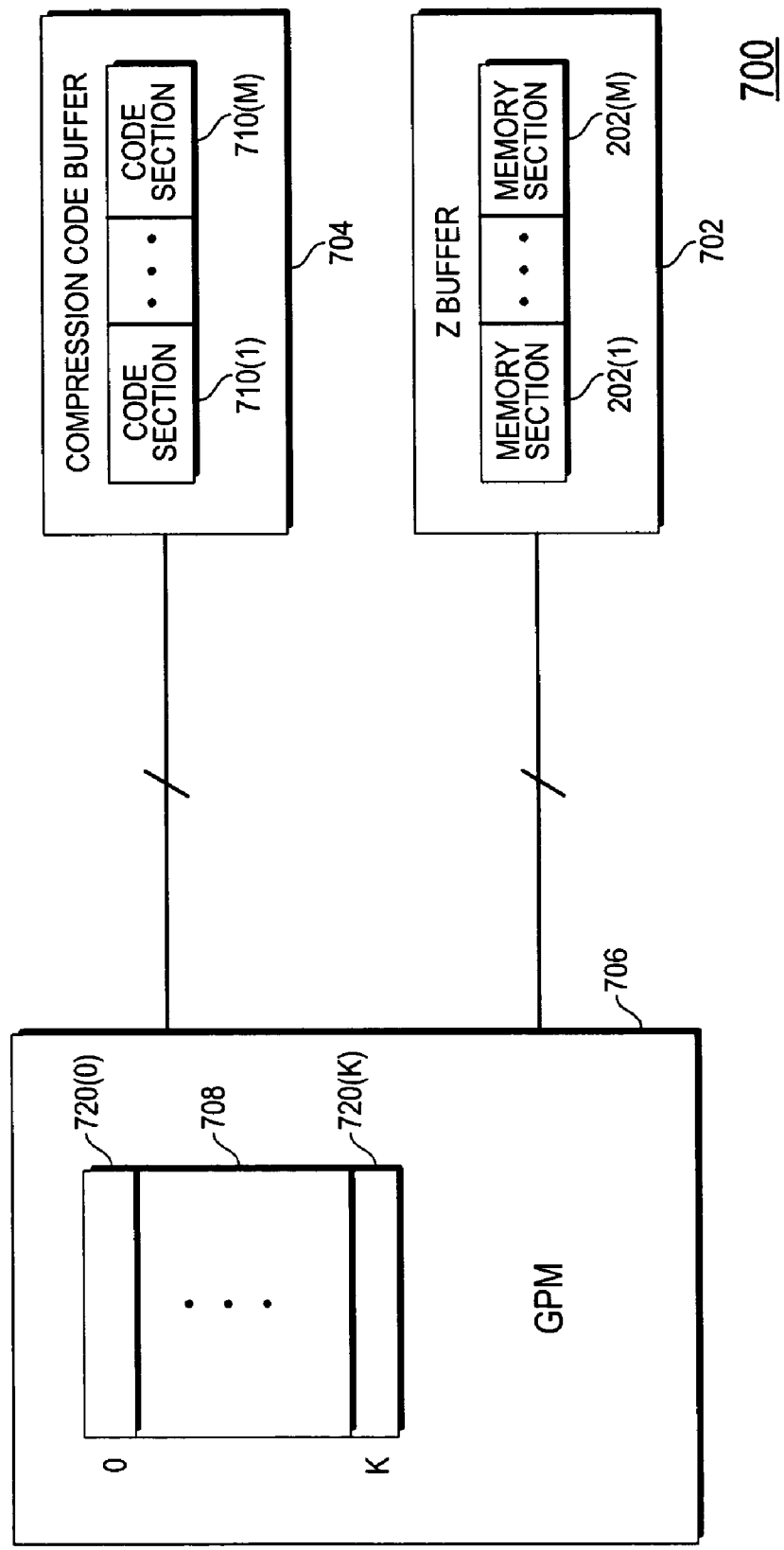
FIG. 7 is a functional block diagram of a system in which one embodiment of the present invention may be implemented.

With reference to FIG. 7, there is shown a graphics processing system 700 in which one embodiment of the present invention may be implemented. For the sake of simplicity, only components pertinent to the present invention are shown. System 700 may comprise one or more additional graphics processing components.

As shown, system 700 comprises a z buffer 702 for storing z related information corresponding to all of the tiles in a display (not shown). In one embodiment, z buffer 702 comprises an m number of memory sections 202, where m is an integer. Each memory section 202 corresponds to one of the tiles of the display, such that there is a one-to-one correspondence between a tile and a memory section 202. Since there are m memory sections 202, it follows that the display has m tiles. Each memory section 202 stores the z related information for its corresponding tile. In one embodiment, this z information may take the form of actual z values (i.e. is uncompressed), or it may take the form of compressed information. As used herein, the term compressed information refers broadly to any information that can be used directly or indirectly to compute/derive actual z values for pixels. In the following discussion, for the sake of illustration, it will be assumed that any compressed information stored in the memory sections 202 will be in the delta compression format (such as that previously described and shown in FIGS. 2, 4, and 5). However, it should be noted that this is not required. If so desired, other compression formats may be used.

System 700 further comprises a graphics processing mechanism (GPM) 706 coupled to z buffer 702. In one embodiment, it is the GPM 706 that performs the graphics processing necessary to generate frames for rendering by the display. In so doing, the GPM 706 uses and updates the z related information stored in the z buffer 702. This includes compressing and decompressing the z related information. In addition, the GPM 706 manages the storage and use of global deltas and compression codes. Overall, in one embodiment, it is the GPM 706 that implements the functionality of the present invention. The operation of GPM 706 will be described in greater detail in a later section. In FIG. 7, GPM 706 is shown as a single component. However, it should be noted that, if so desired, the functionality of GPM 706 may be implemented using a plurality of separate components, where each component implements one or more functions. Such a distributed implementation is within the scope of the present invention.

The functionality of GPM 706 may be implemented using any known technology. For example, GPM 706 may be implemented using hardware logic components (e.g. GPM 706 may be an application specific integrated circuit). Alternatively, the functionality of GPM 706 may be implemented in software, whereby GPM 706 takes the form of a processor executing instructions. These and all other implementations of GPM 706 are within the scope of the present invention.

As shown in FIG. 7, GPM 706 comprises a local storage 708. Local storage 708 may be implemented as a part of GPM 706 (e.g. on the same chip as GPM 706 such that local storage 708 acts as on-chip memory). Alternatively, local storage 708 may be implemented separate from GPM 706. So long as local storage 708 is accessible by GPM 706, it may be implemented in any desired manner or configuration.

Local storage 708 comprises a plurality of entries 720. In the example shown in FIG. 7, local storage 708 has a k+1 number of entries 720, where k is an integer. K is relatively small compared to m such that are many more tiles than there are local storage entries 720. In one embodiment, each entry 720 may store compressed information corresponding to a primitive. This compressed information may take any form, but in one embodiment, it takes the form of a set of global deltas derived in accordance with delta compression for a large primitive. Use of local storage 708 will be described in greater detail in a later section.

System 700 further comprises a compression code buffer 704 coupled to GPM 706. This buffer 704 may be implemented as part of the same memory as z buffer 702, or on a separate memory. Compression code buffer 704 comprises a plurality of code sections 710. In one embodiment, each code section 710 corresponds to a particular tile and a particular z buffer memory section 202 such that there is a one-to-one correspondence between a tile, a code section 710, and a memory section 202. Since there are m tiles and m memory sections 202, there are an m number of code sections 710.

Each code section 710 stores information pertaining to its corresponding tile and corresponding memory section 202. This information indicates to the GPM 706 where certain information should be accessed from, and how that information should be processed. In one embodiment, the information stored in a code section 710 takes the form of an 8-bit code. This code may be one of four code types, as listed below:

| | | |
|---|---|---|
| (1) | 00000000 | tile is in its initial state |
| (2) | 0xxxxxxx | information in z buffer memory section is compressed |
| (3) | 11111111 | information in z buffer memory section is uncompressed |
| (4) | 1xxxxxxx | read compressed information from local storage. |

If the code contains all 0's (i.e. is a type 1 code), then it means that the corresponding tile is in its initial state. In other words, no primitives have been rasterized to that tile. Accordingly, all of the pixels in that tile have z values that are set to the system's initial z value. In such a case, there is no need for the GPM 706 to access the corresponding memory section 202 for z-related information pertaining to that tile. Instead, the GPM 706 can simply assign the initial z value to all of the pixels in that tile.

If the code begins with a 0 followed by 7-bits that are not all 0's (i.e. is a type 2 code), then it means that z-related information pertaining to the corresponding tile is stored in the corresponding memory section 202. It also means that the z-related information is stored in compressed format. In such a case, the GPM 706 knows that it needs to access the corresponding memory section 202 to obtain z-related information for the corresponding tile. The GPM 706 also knows that the information is compressed information, which needs to be decompressed to derive z values for the pixels in the tile. In one embodiment, the 7 bits in the code following the 0 indicate how many entries in the corresponding memory section 202 need to be read to obtain all of the compressed information in that memory section 202.

If the code contains all 1's (i.e. is a type 3 code), then its means that z-related information pertaining to the corresponding tile is stored in the corresponding memory section 202 in uncompressed format. Thus, actual z values are stored in the memory section 202. In such a case, the GPM 706 knows that it needs to access the corresponding memory section 202 to obtain z-related information for the corresponding tile, and that it does not need to decompress the information.

If the code begins with a 1 followed by 7 bits that are not all 1's (i.e. is a type 4 code), then it means that the corresponding tile is completely encompassed by a primitive that qualifies as a large primitive. In such a case, z-related information pertaining to that tile is not stored in the corresponding memory section 202, but rather is stored in an entry 720 of the local storage 708. Given such a code, the GPM 706 knows that it should access the local storage 708 rather than the corresponding memory section 202 to obtain the compressed information for that tile. In one embodiment, the 7 bits in the code following the 1 specify the particular entry 720 in the local storage 708 in which the compressed information is stored. Using this information, the GPM 706 can access that entry 720 quickly and easily to obtain the compressed information.

As described above, the GPM 706 can use the codes in the code sections 710 to quickly obtain information regarding the corresponding tiles and corresponding memory sections 202. In some instances, this information can enable the GPM 706 to avoid accessing the z buffer 702 altogether. By avoiding accesses to the z buffer 702, z buffer traffic can be dramatically reduced.

Sample Operation

Figure 9:
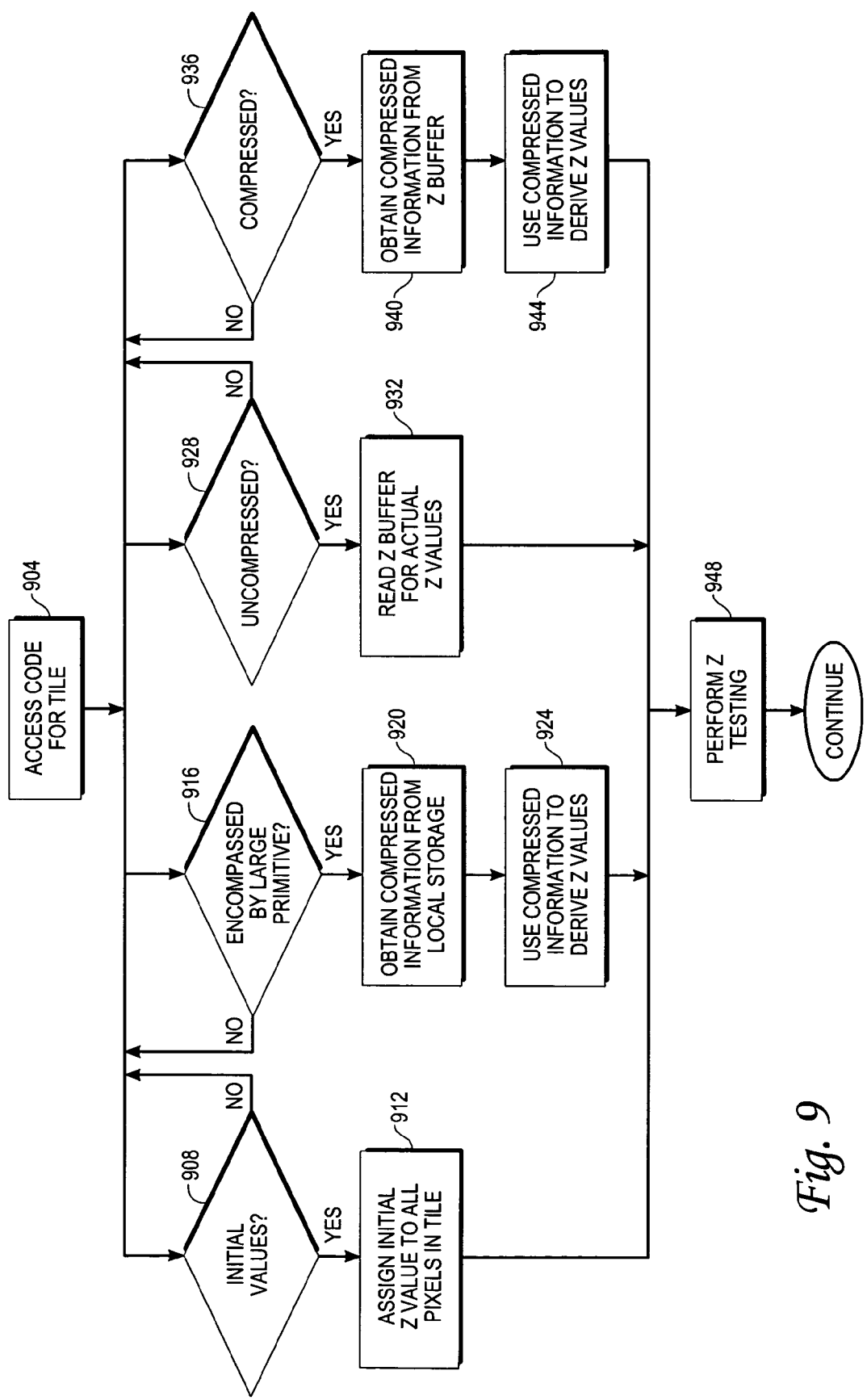
FIGS. 9 and 10 are flow diagrams illustrating the manner in which z processing is carried out in accordance with one embodiment of the present invention.
Figure 10:
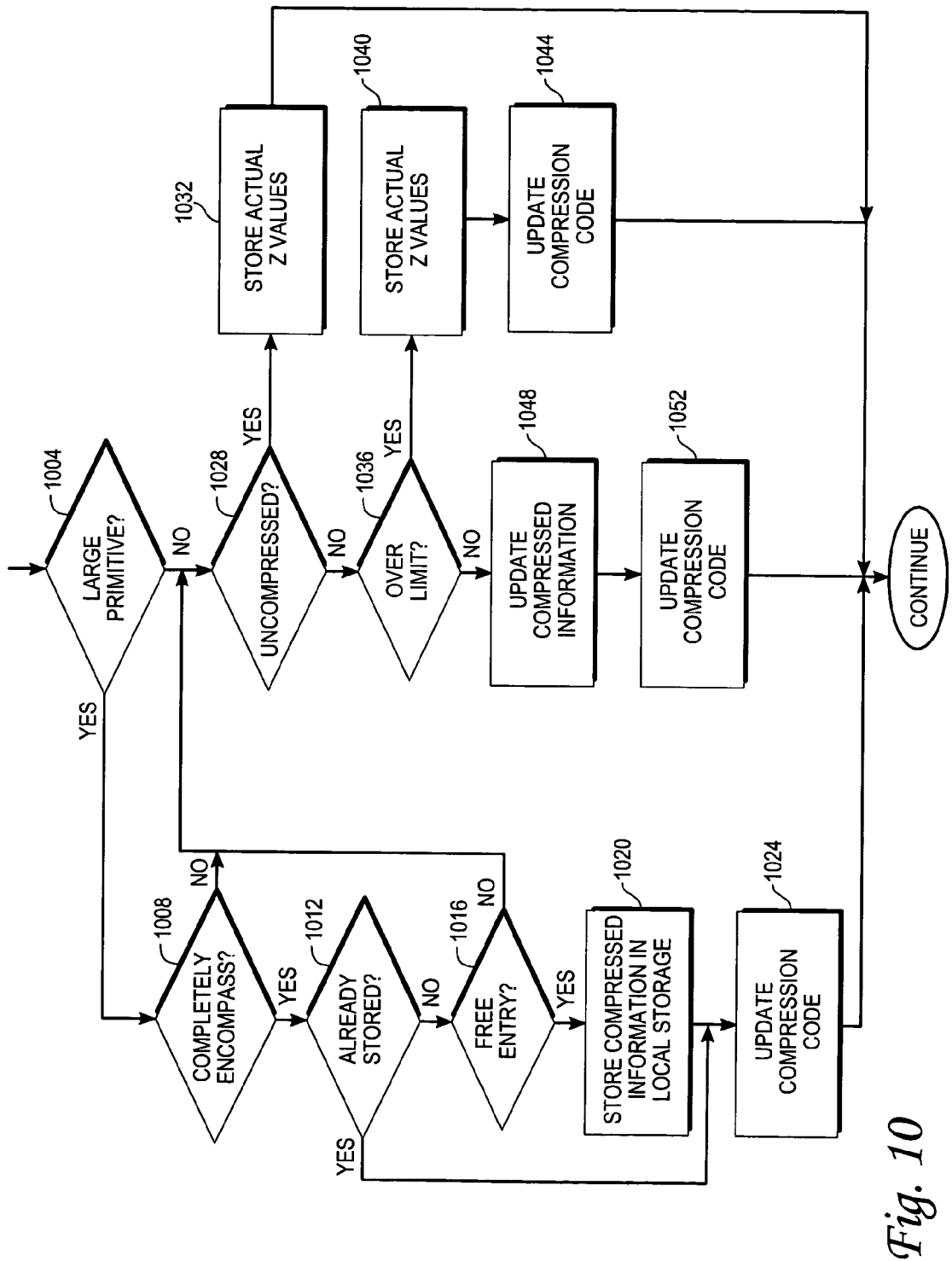

With reference to FIG. 7, and the flow diagrams of FIGS. 8, 9, and 10, the operation of system 700, in accordance with one embodiment of the present invention, will now be described.

Figure 8:
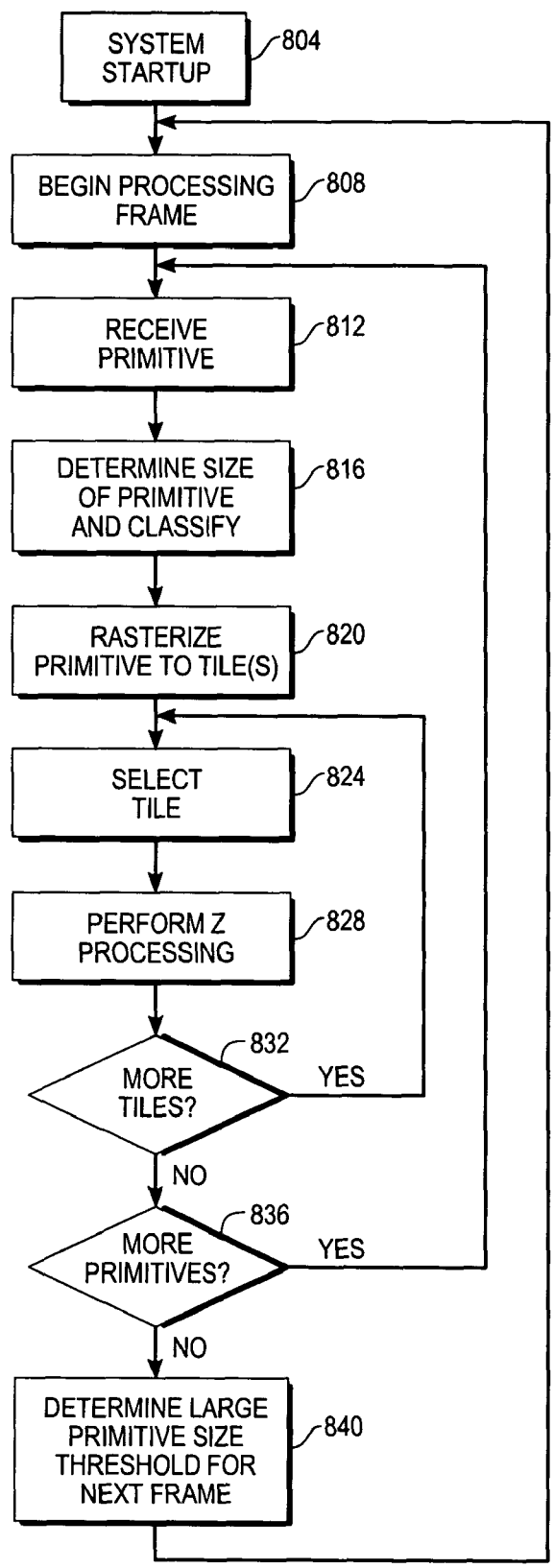
FIG. 8 is a flow diagram illustrating the operation of the system of FIG. 7 in accordance with one embodiment of the present invention.

As shown in FIG. 8, operation begins with system startup (block 804). At startup, a number of initializations are performed. In particular, all of the codes in the code sections 710 (FIG. 7) of the compression code buffer 704 are set to 00000000 to indicate that all of the tiles are currently in their initial state. In addition, the other components (e.g. GPM 706, z buffer 702, local storage 708) may also be initialized.

After startup, GPM 706 begins processing (block 808) a frame for display. This frame will be referred to as the current frame for purposes of the following discussion. To process the current frame, GPM 706 receives (block 812) from a host (not shown) a set of information pertaining to a primitive that belongs in that frame. In one embodiment, the primitive takes the form of a triangle, and the information pertaining to the primitive includes the coordinates of the vertices of the triangle. This primitive will be referred to as the current primitive for purposes of the following discussion.

From the information provided by the host, GPM 706 determines (block 816) the size (e.g. the area) of the current primitive. This size is then compared with a large primitive size threshold to determine whether the current primitive qualifies as a large primitive. At system startup, the size threshold is set to some default value. This default value is used for primitives in the first frame. Thereafter, the size threshold is updated after each frame, and the updated size threshold is used for primitives in the subsequent frame. This will be described in greater detail in a later section when block 840 is discussed. In addition to determining whether the current primitive qualifies as a large primitive, GPM 706 also classifies the current primitive by size. In one embodiment, this involves sorting the current primitive into one of a plurality of "buckets", where each bucket contains primitives within a particular size range.

Thereafter, GPM 706 proceeds to rasterize (block 820) the current primitive to one or more tiles. Put another way, GPM 706 determines which tiles the current primitive is to be mapped/rendered onto. As noted previously, a primitive may span across multiple tiles; thus, the current primitive may be rasterized to a plurality of tiles. After the current primitive is rasterized, GPM 706 selects (block 824) one of the tiles to which the current primitive has been rasterized. GPM 706 then proceeds to perform (block 828) z processing on that tile. Z processing will be described in greater detail in a later section with reference to FIGS. 9 and 10.

After z processing is performed on the tile, GPM 706 proceeds to determine (block 832) whether the current primitive has been rasterized to any more tiles. If so, GPM 706 loops back to block 824 to select the next tile and to perform z processing on that tile. On the other hand, if all of the tiles to which the current primitive has been rasterized have been processed, then processing of the current primitive is finished, and GPM 706 proceeds to block 836 to determine whether the current frame has any more primitives. If so, GPM 706 loops back to block 812 and repeats the above process (blocks 812–836) for the next primitive. Otherwise, processing of the current frame is finished, and GPM 706 proceeds to block 840.

In block 840, GPM 706 determines the large primitive size threshold to be used for primitives in the next frame. In one embodiment, this determination is made based upon the capacity of the local storage 708, and the sizes of the primitives in the current frame. As noted previously, as each primitive in the current frame is processed, it is sorted into one of the plurality of buckets. Thus, by the time all of the primitives in the current frame have been processed, all of the primitives will have been classified by size. In one embodiment, GPM 706 determines the large primitive size threshold for the next frame by selecting a size such that the number of primitives in the buckets having sizes larger than the selected size is close to but does not exceed the capacity of the local storage 708. For example, if local storage has 128 entries, then GPM 706 will select a size such that the number of primitives in the current frame that have sizes larger than the selected size will be close to but does not exceed 128. Determining the size threshold for the next frame in this way assumes that the next frame will be similar to the current frame. For a vast majority of the cases, this assumption holds true.

After the large primitive size threshold for the next frame is determined, GPM 706 clears all of the "buckets" to get the buckets ready for the primitives in the next frame, and loops back to block 808 to begin processing the next frame. This process (blocks 808–840) is repeated to process each and every frame.

In FIG. 8, the process of performing z processing is shown as a single block (block 828). This block is expanded in FIGS. 9 and 10 to show the process in greater detail. In one embodiment, z processing involves two phases: (1) obtaining and processing z information; and (2) updating z information. FIG. 9 illustrates the first phase. FIG. 10 depicts the second phase.

By the time z processing is performed, a current primitive has already been established, and a tile has already been selected. Thus, as shown in FIG. 9, GPM 706 begins z processing by accessing (block 904) the code section 710 (FIG. 7) corresponding to the selected tile, and obtaining the code therefrom. As described previously, the code may be one of four types. Depending upon the type of code, GPM 706 behaves differently.

Specifically, if GPM 706 determines (block 908) that the code is a type 1 code (i.e. 00000000), then it knows that the tile is in its initial state. In such a case, GPM 706 knows that it does not need to access the corresponding memory section 202 to obtain z-related information pertaining to the tile. Rather, GPM 706 can simply assign (block 912) an initial z value to all of the pixels in the tile. As a result, GPM 706 is able to derive z values for all of the pixels in the tile without incurring any z buffer traffic.

If, instead, GPM 706 determines (block 916) that the code is a type 4 code (i.e. 1xxxxxx), then it knows that the tile is currently completely encompassed by a large primitive. In such a case, GPM 706 knows that it does not need to access the corresponding memory section 202 to obtain z-related information pertaining to the tile. Instead, GPM 706 accesses one of the entries 720 of the local storage 708, and obtains (block 920) a set of compressed information therefrom. GPM 706 knows which entry 720 to access because the last 7 bits of the code indicate the specific entry. In one embodiment, the compressed information stored in the entry 720 comprises the global deltas for the large primitive that currently completely encompasses the tile. Using the global deltas and Equation 4, GPM 706 can derive (block 924) the z value for any desired pixel in the tile. In this manner, GPM 706 is able to derive z values for the pixels in the tile without incurring any z buffer traffic.

If, instead, GPM 706 determines (block 928) that the code is a type 3 code (i.e. 11111111), then it knows that z-related information pertaining to the tile is stored in the corresponding memory section 202, and that the information is stored in uncompressed format. In such a case, GPM 706 obtains the z values for the tile by reading (block 932) the actual z values from the corresponding memory section 202.

If, instead, GPM 706 determines (block 936) that the code is a type 2 code (i.e. 0xxxxxxx), then it knows that z-related information pertaining to the tile is stored in the corresponding memory section 202, and that the information is stored in compressed format. It also knows, given the last 7 bits of the code, how many entries of the memory section 202 need to be read. In such a case, GPM 706 accesses the corresponding memory section 202, and obtains (block 940) the compressed information therefrom. GPM 706 then uses (block 944) the compressed information to derive the z value for any desired pixel in the tile. In one embodiment, deriving z values may involve processing a z mask (see FIG. 5 as an example) to determine which pixels are not encompassed by any primitives. For such pixels, an initial z value is assigned. It may also involve processing one or more primitive masks to determine which pixels are encompassed by which primitives. If there are multiple primitive masks, the primitive masks may need to be combined to form an overall multi-bit primitive mask. Once the pixel-to-primitive correlation is determined, the various deltas are used with Equation 4 to derive the z values for any desired pixels.

Using one of the above methods (depending upon the code), GPM 706 derives the current z values for the pixels in the tile. Once that is done, GPM 706 implements a z testing process (block 948) whereby one or more of the current z values are compared with z values associated with the current primitive to determine whether any z values need to be updated. In one embodiment, as part of this process, the deltas for the current primitive are computed/derived. If any z value associated with any pixel of the tile needs to be updated, then GPM 706 proceeds to the update phase depicted in FIG. 10.

In the update phase, GPM 706 initially determines (block 1004) whether the current primitive qualifies as a large primitive. This determination was already made in block 816 of FIG. 8. The result of that determination is used here. If the current primitive qualifies as a large primitive, then GPM 706 determines (block 1008) whether the current primitive completely encompasses the tile. That is, GPM 706 determines whether the z value of every pixel in the tile is determined based upon the current primitive.

If so, GPM 706 proceeds to determine (block 1012) whether the compressed information for the current primitive is already stored in the local storage 708. In one embodiment, the compressed information for the current primitive comprises the current primitive's global deltas. Since the current primitive is a large primitive, it may completely encompass a plurality of tiles. Thus, its global deltas may have already been stored in local storage 708 as a result of processing another tile. If the current primitive's global deltas are already stored in local storage 708, then there is no need to store them again; hence, GPM 706 proceeds to block 1024.

Otherwise, GPM 706 proceeds to determine (block 1016) whether the local storage 708 has any free entries 720. If a free entry 720 is found, then GPM 706 stores (block 1020) the current primitive's global deltas into that entry 720. Thereafter, GPM 706 updates (block 1024) the code in the code section 710 corresponding to the tile to a type 4 code to indicate that the tile is now completely encompassed by a large primitive. The last 7 bits of this code will indicate the specific entry 720 in local storage 708 in which the compressed information for the current primitive is stored. In this manner, z-related information for the tile is updated. Notice that this update is achieved without accessing the corresponding z buffer memory section 202. Thus, no z buffer traffic is incurred.

In one embodiment, if the current primitive does not qualify as a large primitive, or if the current primitive does not completely encompass the tile, or if the local storage 708 has no free entries, then the corresponding memory section 202 is accessed to update the z-related information for the tile. To do so, GPM 706 proceeds to block 1028 to determine whether z-related information is currently stored in the corresponding memory section 202 in uncompressed format. This determination was made in block 928 of FIG. 9. The result of that determination is used here. If so, then GPM 706 stores the updated z-related information into the corresponding memory section 202 in uncompressed format. That is, GPM 706 stores the actual z values into the corresponding memory section 202. Z processing of the tile is thus completed.

If the z related information stored in the corresponding memory section 202 is not currently in uncompressed format, then GPM 706 proceeds to determine (block 1036) whether rasterizing the current primitive to the tile will cause a predetermined primitive limit to be exceeded. Recall from previous discussion that when a certain number of primitives have been rasterized to the same tile, it is more resource efficient to store actual z values in the corresponding memory section 202 rather than implement delta compression. In block 1036, GPM 706 checks for this condition (e.g. by determining how many sets of deltas are stored in the memory section 202 or by checking the value of the integer n in the header entry). If the limit will be exceeded, then GPM 706 stores (block 1040) the updated z related information into the corresponding memory section 202 in uncompressed format (i.e. as actual z values). Thereafter, GPM 706 updates (block 1044) the code in the corresponding code section 710 to a type 3 code to indicate that the z related information in the corresponding memory section 202 is now in uncompressed format. Z processing of the tile is thus completed.

On the other hand, if the primitive limit will not be exceeded, then GPM 706 proceeds to update (block 1048) the compressed information stored in the corresponding memory section 202. This may involve updating the z mask (see FIG. 5 as an example) to indicate which pixels of the tile are now not encompassed by any primitive. It may also involve adding a set of deltas (the deltas derived for the current primitive), which may require adding a new entry and updating the integer n. It may further involve adding and/or updating one or more primitive masks to indicate which pixels are encompassed by which primitive and hence which set of deltas. If a new primitive mask is added, it may require updating one or more existing primitive masks (recall the concept of bit packing discussed previously). Updating the compressed information may further involve removing any deltas that are no longer needed. For example, if the primitive mask or masks indicate that a set of deltas no longer has any pixels assigned to it, then that set of deltas can be deleted from the memory section 202. These and other tasks may be performed during the updating process.

Thereafter, GPM 706 proceeds to update (block 1052) the code section 710 corresponding to the tile. This may involve updating the code to a type 2 code (if the code is not already a type 2 code). It may also involve updating the last 7 bits of the code to indicate how many entries now need to be read from the memory section. After the code is updated, z processing of the tile is complete.

In the manner described, z processing is carried out in a very traffic-efficient manner. Z buffer traffic is avoided when possible (e.g. for large primitives and tiles that are still in their initial state). Even when the buffer is accessed, traffic is kept to a minimum because the z related information in the buffer is compressed (when it is efficient to do so). By minimizing z buffer traffic in this way, processing performance of the overall system is significantly improved.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A method comprising:
   receiving information for a current primitive;
   rasterizing the current primitive to a tile, wherein the tile has a corresponding buffer section for storing information pertaining to the tile;
   determining whether the tile is currently completely encompassed by a large primitive; and
   in response to a determination that the tile is currently completely encompassed by a large primitive, obtaining information pertaining to the tile from a local storage rather than from the corresponding buffer section, thereby reducing buffer section traffic.

2. The method of claim 1, wherein determining comprises:
processing a code corresponding to the tile to determine whether the code indicates that the tile is currently completely encompassed by a large primitive.

3. The method of claim 2, wherein the code indicates that the tile is currently completely encompassed by a large primitive, and wherein the code comprises information indicating a specific location in the local storage at which information pertaining to the tile is stored.

4. The method of claim 1, wherein the information pertaining to the tile that is obtained from the local storage comprises compressed information.

5. The method of claim 4, wherein the tile comprises one or more pixels, and wherein the compressed information can be used to derive a z value for at least one of the pixels in the tile.

6. The method of claim 4, wherein the compressed information comprises z-related information derived in accordance with delta-based z compression.

7. The method of claim 6, wherein the tile comprises one or more pixels, and wherein the compressed information comprises one or more deltas, which can be used to derive a z value for at least one of the pixels in the tile.

8. The method of claim 7, further comprising:
using the compressed information to derive a z value for a particular pixel in the tile.

9. The method of claim 8, wherein the z value for the particular pixel is derived using the following equation:

$$Z_n = Z_s + Z_x * X_n + Z_y * Y_n;$$

where $Z_s$, $Z_x$, and $Z_y$ are deltas, $X_n$ and $Y_n$ are x and y coordinates of the particular pixel, and $Z_n$ is the z value for the particular pixel.

10. The method of claim 1, further comprising:
determining whether the tile is in an initial state; and
in response to a determination that the tile is in an initial state, foregoing accessing of the corresponding buffer section.

11. The method of claim 10, wherein determining whether the tile is in an initial state comprises:
processing a code corresponding to the tile to determine whether the code indicates that the tile is in an initial state.

12. The method of claim 10, wherein the tile comprises one or more pixels, and wherein the method further comprises:
in response to a determination that the tile is in an initial state, assigning an initial z value to one or more pixels in the tile.

13. The method of claim 1, further comprising:
if the tile is not currently completely encompassed by a large primitive, obtaining information pertaining to the tile from the corresponding buffer section.

14. The method of claim 13, wherein the information pertaining to the tile obtained from the corresponding buffer section comprises compressed information.

15. The method of claim 14, wherein the tile comprises one or more pixels, and wherein the compressed information can be used to derive a z value for at least one of the pixels in the tile.

16. The method of claim 14, wherein the compressed information comprises z-related information derived in accordance with delta-based z compression.

17. The method of claim 16, wherein the tile comprises one or more pixels, and wherein the compressed information comprises:
a set of one or more deltas corresponding to a previously rasterized primitive, wherein the set of deltas can be used to derive a z value for at least one of the pixels in the tile; and
a primitive mask comprising information indicating which one or more pixels of the tile are encompassed by the previously rasterized primitive.

18. The method of claim 17, further comprising:
processing the primitive mask to determine a particular pixel that is encompassed by the previously rasterized primitive; and
using the set of deltas to derive a z value for the particular pixel.

19. The method of claim 17, wherein the compressed information further comprises a z mask comprising information indicating which zero or more pixels of the tile are not encompassed by any primitive.

20. The method of claim 19, further comprising:
processing the primitive mask and the z mask to determine a particular pixel that is encompassed by the previously rasterized primitive; and
using the set of deltas to derive a z value for the particular pixel.

21. The method of claim 16, wherein the tile comprises one or more pixels, and wherein the compressed information comprises:
a set of one or more deltas corresponding to a previously rasterized primitive, wherein the set of deltas can be used to derive a z value for at least one of the pixels in the tile; and
a plurality of primitive masks which, when combined, comprise information indicating which one or more pixels of the tile are encompassed by the previously rasterized primitive.

22. The method of claim 21, further comprising:
processing the plurality of primitive masks to determine a particular pixel that is encompassed by the previously rasterized primitive; and
using the set of deltas to derive a z value for the particular pixel.

23. The method of claim 22, wherein each primitive mask is a bit mask comprising one bit for each pixel of the tile, and wherein processing the plurality of primitive masks comprises:
combining corresponding bits from each primitive mask to form a multi-bit value for each pixel, thereby deriving an overall multi-bit primitive mask for the tile.

24. The method of claim 21, wherein the compressed information further comprises a z mask comprising information indicating which zero or more pixels of the tile are not encompassed by any primitive.

25. The method of claim 24, further comprising:
processing the plurality of primitive masks and the z mask to determine a particular pixel that is encompassed by the previously rasterized primitive; and
using the set of deltas to derive a z value for the particular pixel.

26. The method of claim 25, wherein each primitive mask is a bit mask comprising one bit for each pixel of the tile, and wherein processing the plurality of primitive masks comprises:
combining corresponding bits from each primitive mask to form a multi-bit value for each pixel, thereby deriving an overall multi-bit primitive mask for the tile.

27. The method of claim 1, further comprising:
  determining whether the current primitive qualifies as a large primitive;
  determining whether the tile is completely encompassed by the current primitive; and
  in response to a determination that the current primitive qualifies as a large primitive and the tile is completely encompassed by the current primitive, storing updated information pertaining to the tile in the local storage rather than the corresponding buffer section.

28. The method of claim 27, further comprising:
  updating a code corresponding to the tile to indicate that the tile is completely encompassed by a large primitive.

29. The method of claim 28, wherein the updated information pertaining to the tile is stored in a specific location in the local storage, and wherein the code is updated to comprise information indicating the specific location in the local storage at which the updated information is stored.

30. The method of claim 27, wherein the updated information pertaining to the tile comprises compressed information.

31. The method of claim 30, wherein the tile comprises one or more pixels, and wherein the compressed information can be used to derive a z value for at least one of the pixels in the tile.

32. The method of claim 30, wherein the compressed information comprises z-related information derived in accordance with delta-based z compression.

33. The method of claim 32, wherein the tile comprises one or more pixels, and wherein the compressed information comprises one or more deltas corresponding to the current primitive, which can be used to derive a z value for at least one of the pixels in the tile.

34. The method of claim 27, further comprising:
  in response to a determination that the current primitive does not qualify as a large primitive, or the tile is not completely encompassed by the current primitive, or both, storing updated information pertaining to the tile in the corresponding buffer section.

35. The method of claim 34, wherein the tile comprises one or more pixels, and wherein storing comprises:
  determining whether the updated information should be stored in uncompressed format; and
  in response to a determination that the updated information should be stored in uncompressed format, storing the updated information in the corresponding buffer section in uncompressed format.

36. The method of claim 35, wherein determining whether the updated information should be stored in uncompressed format comprises:
  determining whether a maximum number of primitives rasterized to the tile has been exceeded.

37. The method of claim 35, further comprising:
  in response to a determination that the updated information should be stored in uncompressed format, updating a code corresponding to the tile to indicate that information pertaining to the tile is stored in the corresponding buffer section in uncompressed format.

38. The method of claim 34, wherein storing updated information comprises:
  storing compressed information in the corresponding buffer section.

39. The method of claim 38, wherein the tile comprises one or more pixels, and wherein the compressed information can be used to derive a z value for at least one of the pixels in the tile.

40. The method of claim 38, wherein the compressed information comprises z-related information derived in accordance with delta-based z compression.

41. The method of claim 40, wherein the tile comprises one or more pixels, and wherein storing compressed information comprises:
  storing a set of one or more deltas corresponding to the current primitive, wherein the set of deltas can be used to derive a z value for at least one of the pixels in the tile.

42. The method of claim 41, wherein storing compressed information further comprises:
  updating one or more primitive masks stored in the corresponding buffer section to indicate which one or more pixels of the tile are encompassed by the current primitive.

43. The method of claim 41, wherein storing compressed information further comprises:
  storing a new primitive mask in the corresponding buffer section; and
  updating one or more other primitive masks stored in the corresponding buffer section to indicate, when all of the primitive masks are combined, which one or more pixels of the tile are encompassed by the current primitive.

44. The method of claim 41, wherein storing compressed information further comprises:
  updating a z mask to indicate which zero or more pixels of the tile are not encompassed by any primitive.

45. The method of claim 27, wherein the current primitive corresponds to a current frame, and wherein the method further comprises:
  determining a large primitive size threshold for primitives in a subsequent frame based upon sizes of primitives in the current frame.

46. A graphics processing mechanism, comprising:
  a mechanism for receiving information for a current primitive;
  a mechanism for rasterizing the current primitive to a tile, wherein the tile has a corresponding buffer section for storing information pertaining to the tile;
  a mechanism for determining whether the tile is currently completely encompassed by a large primitive; and
  a mechanism for obtaining, in response to a determination that the tile is currently completely encompassed by a large primitive, information pertaining to the tile from a local storage rather than from the corresponding buffer section, thereby reducing buffer section traffic.

47. The graphics processing mechanism of claim 46, wherein the mechanism for determining comprises:
  a mechanism for processing a code corresponding to the tile to determine whether the code indicates that the tile is currently completely encompassed by a large primitive.

48. The graphics processing mechanism of claim 47, wherein the code indicates that the tile is currently completely encompassed by a large primitive, and wherein the code comprises information indicating a specific location in the local storage at which information pertaining to the tile is stored.

49. The graphics processing mechanism of claim 46, wherein the information pertaining to the tile that is obtained from the local storage comprises compressed information.

50. The graphics processing mechanism of claim 49, wherein the tile comprises one or more pixels, and wherein the compressed information can be used to derive a z value for at least one of the pixels in the tile.

51. The graphics processing mechanism of claim 49, wherein the compressed information comprises z-related information derived in accordance with delta-based z compression.

52. The graphics processing mechanism of claim 51, wherein the tile comprises one or more pixels, and wherein the compressed information comprises one or more deltas, which can be used to derive a z value for at least one of the pixels in the tile.

53. The graphics processing mechanism of claim 52, further comprising:
a mechanism for using the compressed information to derive a z value for a particular pixel in the tile.

54. The graphics processing mechanism of claim 53, wherein the z value for the particular pixel is derived using the following equation:

$$Z_n = Z_s + Z_x * X_n + Z_y * Y_n;$$

where $Z_s$, $Z_x$, and $Z_y$ are deltas, $X_n$ and $Y_n$ are x and y coordinates of the particular pixel, and $Z_n$ is the z value for the particular pixel.

55. The graphics processing mechanism of claim 46, further comprising:
a mechanism for determining whether the tile is in an initial state; and
a mechanism for foregoing, in response to a determination that the tile is in an initial state, accessing of the corresponding buffer section.

56. The graphics processing mechanism of claim 55, wherein the mechanism for determining whether the tile is in an initial state comprises:
a mechanism for processing a code corresponding to the tile to determine whether the code indicates that the tile is in an initial state.

57. The graphics processing mechanism of claim 55, wherein the tile comprises one or more pixels, and wherein the graphics processing mechanism further comprises:
a mechanism for assigning, in response to a determination that the tile is in an initial state, an initial z value to one or more pixels in the tile.

58. The graphics processing mechanism of claim 46, further comprising:
a mechanism for obtaining, if the tile is not currently completely encompassed by a large primitive, information pertaining to the tile from the corresponding buffer section.

59. The graphics processing mechanism of claim 58, wherein the information pertaining to the tile obtained from the corresponding buffer section comprises compressed information.

60. The graphics processing mechanism of claim 59, wherein the tile comprises one or more pixels, and wherein the compressed information can be used to derive a z value for at least one of the pixels in the tile.

61. The graphics processing mechanism of claim 59, wherein the compressed information comprises z-related information derived in accordance with delta-based z compression.

62. The graphics processing mechanism of claim 61, wherein the tile comprises one or more pixels, and wherein the compressed information comprises:
a set of one or more deltas corresponding to a previously rasterized primitive, wherein the set of deltas can be used to derive a z value for at least one of the pixels in the tile; and
a primitive mask comprising information indicating which one or more pixels of the tile are encompassed by the previously rasterized primitive.

63. The graphics processing mechanism of claim 62, further comprising:
a mechanism for processing the primitive mask to determine a particular pixel that is encompassed by the previously rasterized primitive; and
a mechanism for using the set of deltas to derive a z value for the particular pixel.

64. The graphics processing mechanism of claim 62, wherein the compressed information further comprises a z mask comprising information indicating which zero or more pixels of the tile are not encompassed by any primitive.

65. The graphics processing mechanism of claim 64, further comprising:
a mechanism for processing the primitive mask and the z mask to determine a particular pixel that is encompassed by the previously rasterized primitive; and
a mechanism for using the set of deltas to derive a z value for the particular pixel.

66. The graphics processing mechanism of claim 61, wherein the tile comprises one or more pixels, and wherein the compressed information comprises:
a set of one or more deltas corresponding to a previously rasterized primitive, wherein the set of deltas can be used to derive a z value for at least one of the pixels in the tile; and
a plurality of primitive masks which, when combined, comprise information indicating which one or more pixels of the tile are encompassed by the previously rasterized primitive.

67. The graphics processing mechanism of claim 66, further comprising:
a mechanism for processing the plurality of primitive masks to determine a particular pixel that is encompassed by the previously rasterized primitive; and
a mechanism for using the set of deltas to derive a z value for the particular pixel.

68. The graphics processing mechanism of claim 67, wherein each primitive mask is a bit mask comprising one bit for each pixel of the tile, and wherein processing the plurality of primitive masks comprises:
combining corresponding bits from each primitive mask to form a multi-bit value for each pixel, thereby deriving an overall multi-bit primitive mask for the tile.

69. The graphics processing mechanism of claim 66, wherein the compressed information further comprises a z mask comprising information indicating which zero or more pixels of the tile are not encompassed by any primitive.

70. The graphics processing mechanism of claim 69, further comprising:
a mechanism for processing the plurality of primitive masks and the z mask to determine a particular pixel that is encompassed by the previously rasterized primitive; and
a mechanism for using the set of deltas to derive a z value for the particular pixel.

71. The graphics processing mechanism of claim 70, wherein each primitive mask is a bit mask comprising one bit for each pixel of the tile, and wherein the mechanism for processing the plurality of primitive masks comprises:
a mechanism for combining corresponding bits from each primitive mask to form a multi-bit value for each pixel, thereby deriving an overall multi-bit primitive mask for the tile.

72. The graphics processing mechanism of claim 46, further comprising:
- a mechanism for determining whether the current primitive qualifies as a large primitive;
- a mechanism for determining whether the tile is completely encompassed by the current primitive; and
- a mechanism for storing, in response to a determination that the current primitive qualifies as a large primitive and the tile is completely encompassed by the current primitive, updated information pertaining to the tile in the local storage rather than the corresponding buffer section.

73. The graphics processing mechanism of claim 72, further comprising:
- a mechanism for updating a code corresponding to the tile to indicate that the tile is completely encompassed by a large primitive.

74. The graphics processing mechanism of claim 73, wherein the updated information pertaining to the tile is stored in a specific location in the local storage, and wherein the code is updated to comprise information indicating the specific location in the local storage at which the updated information is stored.

75. The graphics processing mechanism of claim 72, wherein the updated information pertaining to the tile comprises compressed information.

76. The graphics processing mechanism of claim 75, wherein the tile comprises one or more pixels, and wherein the compressed information can be used to derive a z value for at least one of the pixels in the tile.

77. The graphics processing mechanism of claim 75, wherein the compressed information comprises z-related information derived in accordance with delta-based z compression.

78. The graphics processing mechanism of claim 77, wherein the tile comprises one or more pixels, and wherein the compressed information comprises one or more deltas corresponding to the current primitive, which can be used to derive a z value for at least one of the pixels in the tile.

79. The graphics processing mechanism of claim 72, further comprising:
- a mechanism for storing, in response to a determination that the current primitive does not qualify as a large primitive, or the tile is not completely encompassed by the current primitive, or both, updated information pertaining to the tile in the corresponding buffer section.

80. The graphics processing mechanism of claim 79, wherein the tile comprises one or more pixels, and wherein the mechanism for storing comprises:
- a mechanism for determining whether the updated information should be stored in uncompressed format; and
- a mechanism for storing, in response to a determination that the updated information should be stored in uncompressed format, the updated information in the corresponding buffer section in uncompressed format.

81. The graphics processing mechanism of claim 80, wherein the mechanism for determining whether the updated information should be stored in uncompressed format comprises:
- a mechanism for determining whether a maximum number of primitives rasterized to the tile has been exceeded.

82. The graphics processing mechanism of claim 80, further comprising:
- a mechanism for updating, in response to a determination that the updated information should be stored in uncompressed format, a code corresponding to the tile to indicate that information pertaining to the tile is stored in the corresponding buffer section in uncompressed format.

83. The graphics processing mechanism of claim 79, wherein the mechanism for storing updated information comprises:
- a mechanism for storing compressed information in the corresponding buffer section.

84. The graphics processing mechanism of claim 83, wherein the tile comprises one or more pixels, and wherein the compressed information can be used to derive a z value for at least one of the pixels in the tile.

85. The graphics processing mechanism of claim 83, wherein the compressed information comprises z-related information derived in accordance with delta-based z compression.

86. The graphics processing mechanism of claim 85, wherein the tile comprises one or more pixels, and wherein the mechanism for storing compressed information comprises:
- a mechanism for storing a set of one or more deltas corresponding to the current primitive, wherein the set of deltas can be used to derive a z value for at least one of the pixels in the tile.

87. The graphics processing mechanism of claim 86, wherein the mechanism for storing compressed information further comprises:
- a mechanism for updating one or more primitive masks stored in the corresponding buffer section to indicate which one or more pixels of the tile are encompassed by the current primitive.

88. The graphics processing mechanism of claim 86, wherein the mechanism for storing compressed information further comprises:
- a mechanism for storing a new primitive mask in the corresponding buffer section; and
- a mechanism for updating one or more other primitive masks stored in the corresponding buffer section to indicate, when all of the primitive masks are combined, which one or more pixels of the tile are encompassed by the current primitive.

89. The graphics processing mechanism of claim 86, wherein the mechanism for storing compressed information further comprises:
- a mechanism for updating a z mask to indicate which zero or more pixels of the tile are not encompassed by any primitive.

90. The graphics processing mechanism of claim 72, wherein the current primitive corresponds to a current frame, and wherein the graphics processing mechanism further comprises:
- a mechanism for determining a large primitive size threshold for primitives in a subsequent frame based upon sizes of primitives in the current frame.

* * * * *